(12) United States Patent
Gardiner

(10) Patent No.: US 6,619,717 B2
(45) Date of Patent: Sep. 16, 2003

(54) PROTECTIVE LINER RETAINER FOR CARGO BED PANELS

(75) Inventor: Shane Gardiner, 852 E. 300 North, Payson, UT (US) 84651

(73) Assignees: Michael Glenn McHargue, Cedar City, UT (US); Shane Gardiner, Payson, UT (US)

( * ) Notice: Subject to any disclaimer, the term of this patent is extended or adjusted under 35 U.S.C. 154(b) by 0 days.

(21) Appl. No.: 09/991,343

(22) Filed: Nov. 16, 2001

(65) Prior Publication Data

US 2003/0094829 A1 May 22, 2003

(51) Int. Cl.$^7$ ............................................. B62D 33/00
(52) U.S. Cl. ..................................... 296/39.2; 296/39.1
(58) Field of Search ............................... 296/39.2, 39.1

(56) References Cited

U.S. PATENT DOCUMENTS

| | | | |
|---|---|---|---|
| 4,572,568 A | 2/1986 | Kapp et al. | 296/39 R |
| 4,575,146 A | 3/1986 | Markos | 296/39 R |
| 4,595,229 A | 6/1986 | Wagner | 296/39 R |
| 4,740,026 A | 4/1988 | Wagner | 296/39 R |
| 4,740,027 A | 4/1988 | Ormiston | 296/39 R |
| 4,750,776 A * | 6/1988 | Barben | 296/39.2 |
| 4,796,942 A | 1/1989 | Robinson et al. | 296/39.2 |
| 4,850,633 A | 7/1989 | Emery | 296/39.2 |
| 4,906,040 A | 3/1990 | Edwards | 296/39.2 |
| 5,046,775 A | 9/1991 | Marcum, Jr. et al. | 296/39.2 |
| 5,100,193 A | 3/1992 | Oprea et al. | 296/39.2 |
| 5,131,709 A | 7/1992 | Spica | 296/39.2 |
| 5,150,940 A * | 9/1992 | Kennedy | 296/39.2 |
| 5,207,472 A * | 5/1993 | Gower | 296/39.2 |
| 5,221,119 A * | 6/1993 | Emery | 296/39.2 |
| 5,308,133 A * | 5/1994 | Mangum et al. | 296/39.2 |
| 5,345,658 A * | 9/1994 | Kennedy | 296/39.2 |
| 5,367,820 A * | 11/1994 | Lafforthun | 43/60 |
| 5,419,603 A * | 5/1995 | Kremer et al. | 296/39.2 |
| 5,513,934 A * | 5/1996 | German | 296/39.2 |
| 6,000,741 A * | 12/1999 | Reynolds et al. | 296/39.2 |
| 6,203,090 B1 | 3/2001 | Vitoorapakorn | 296/39.2 |
| 6,237,980 B1 * | 5/2001 | Miles et al. | 296/39.2 |

* cited by examiner

Primary Examiner—D. Glenn Dayoan
Assistant Examiner—Lori L Coletta
(74) Attorney, Agent, or Firm—J. David Nelson

(57) ABSTRACT

The protective liner retainer of the present invention comprises a panel attachment member for securing the retainer to a cargo panel of a cargo bed or other material handling bin, a liner attachment member with cleats for securing a protective liner to the retainer, and a support member for attaching the liner attachment member to the panel attachment member and for defining the thickness of liner that may be secured by the retainer by defining the separation between the panel attachment member and the liner attachment member.

32 Claims, 5 Drawing Sheets

PROTECTIVE LINER RETAINER FOR CARGO BED PANELS

FIELD OF THE INVENTION

The present invention is in the field of cargo bed and bin liners and in particular in the field of devices for securing protective liners to cargo beds and bins.

BACKGROUND OF THE INVENTION

The loading, transporting and unloading of cargo from the cargo bed of transport vehicles, such as dump trucks and train cargo bin cars, causes cumulative structural and finish damage to the interior cargo bed surfaces or panels, hereinafter "cargo panels". This progressively diminishes the functionality and appearance of the vehicle and can result in substantial cost being incurred for repairs and refinishing. This problem is also experienced with a variety of other cargo and materials handling vessels such as the bucket of front end loaders and backhoes and the salt bins and blades of snow plows. The exposed surfaces of such cargo and materials handling vessels are also referred to hereinafter as "cargo panels".

A number of liners and liner retainers have been developed for pickup truck beds which are disclosed in the prior art. Most of these liners and retainers relate to prefabricated liners and liner kits which are manufactured to fit a specific pickup truck bed. U. S. Pat. No. 6,203,090 B 1 to Vitoorapakorn discloses a retainer which uses a retaining plate attached to the truck bed to anchor a ring which tightens against the inside of the liner. U.S. Pat. No. 4,575,146 to Markos discloses a retainer for a pickup truck liner sidewall which attaches to the side rail of the truck bed. U.S. Pat. No. 5,131,709 to Spica discloses a liner retainer system comprising a combination of adhesive, velcro, and fasteners. U.S. Pat. No. 4,740,027 to Ormiston discloses a spring wire clip for retaining a pickup truck bed liner, the side walls of which terminate underneath the side rail. U.S. Pat. No. 4,850,633 to Emery, U.S. Pat. No. 4,595,229 to Wagner, U.S. Pat. No. 4,796,942 to Robinson, and U.S. Pat. No. 4,572,568 to Kapp et al. each disclose a fastener which secures a liner underneath the side rail without penetrating the inside surface of the liner. U.S. Pat. No. 4,906,040 to Edwards discloses a retainer clip which is inserted through a slot pair in the exterior wall of the truck bed. U.S. Pat. No. 5,100,193 to Oprea et al. discloses a clip retainer which fits the top of a specially formed liner and fits against the underside of the side rail. U.S. Pat. No. 5,046,775 to Marcum and U.S. Pat. No. 4,740,026 to Wagner disclose fasteners which extends through the outside of the truck bed and are rotated to urge against the edge of the liner which extends beneath the side rail.

The liner retainers disclosed in the patents identified are designed specifically for pickup truck cargo beds. None of these devices provides for securing field cut or plain sheet protective liners in the cargo bed of vehicles of varying dimensions, such as dump truck beds and train car beds.

There are two commonly used means of lining cargo panels of various types of vehicles. One means involves spraying on a coating of resilient material. This type of liner is designed to protect the bed from rust and scratches and to provide some protection from gouges. A second more widely used means is a drop-in liner. Drop-in liners affix to cargo panels, typically with screws and have cut-outs for cargo hooks and cleats. Typically these drop-in liners are made of plastic and are substantially thicker and more economical than spray on linings.

Drop in liners have the unfortunate drawback of curling at their ends. This undermines the protection as curling exposes parts of the cargo bed wall to load impact and elemental exposure. It also impedes the loading and unloading of the cargo.

Presently used means for anchoring protective liners to cargo panels such as bolting glueing or adhering with hook and loop fastener, are inadequate. Some user weld a flat bar to the truck bed and insert the edge of the liner under it. However, the primary means of securing liners to cargo panels is bolting the liner directly to the panels.

An objective of the present invention is to provide a retainer for securing protective liners to the cargo panels of cargo transport or handling vehicles.

A further objective of the present invention is to provide a retainer for securing protective liners to cargo panels of varying dimensions and configurations.

A further objective of the present invention is to provide a retainer for securing protective liners to cargo panels with varying slopes and intersecting angles.

A further objective of the present invention is to provide a retainer for securing field cut or field fit protective liners to cargo panels of varying dimensions and configurations.

A further objective of the present invention is to provide a retainer for securing protective liners to cargo panels which provides for sealing all edges of the liner against material or moisture intrusion.

A further objective of the present invention is to provide a retainer for securing protective liners to cargo panels which is readily removable for the removal and replacement of the protective liner.

SUMMARY OF THE INVENTION

Cargo beds of cargo handling and may consist of one or more cargo panels. The cargo bed of a flat bed truck, for instance, might have a single cargo panel, whereas, a dump truck cargo bed will have at least four cargo panels. Liners are secured to each cargo panel by embodiments of the liner retainer of the present invention. A basic retainer may be used at the outside edge of a liner. Abutting liners with different slopes can be secured with basic retainers or with concave or convex joint retainer embodiments, depending upon the angle between the abutting liners.

Protective liners placed on the cargo panels protect the panels from wear related to contact with load and weathering. The liners are prone to curl at their ends exposing the panels. The present invention prevents curling of a liner while securing the liner to the cargo panel. The present invention provides for the protection of the finish and the structural integrity of the protected cargo panel, tank or bin, and also provides for increased ease of loading, handling and dumping of material such as gravel, snow and salt, and for ease in cleaning.

The present invention may be used to protect snow plow blades, street sweepers, grader blades, sand and salt hoppers for snow removal equipment, industrial shovels, haul pack beds, belly dump beds for train car or truck, end dump truck bed, asphalt transfer rigs, grain bins and silo's, back hoe buckets, front end loader buckets, lime silos, storage tanks, old mining equipment, thickeners, concrete ready mix trucks nix tanks and chutes.

Plastic is a preferred material for the liners, but other materials such as metal, metal alloy, wood, fiberglass and rubber may be used with the present invention. Ultra high molecular weight (UHMW) plastic, polypropylene, and high density polyethylene are preferred plastics for the liner material. Preferred embodiments of the retainer are constructed of a metal or metal alloy, but may be constructed of plastic or other resilient material.

The basic embodiment of the retainer comprises a panel attachment member for securing the retainer to a cargo panel, a liner attachment member with cleats for securing a protective liner to the retainer, and a support member for attaching the liner attachment member to the panel attachment member and for defining the thickness of liner that may be secured by the retainer by defining the separation between the panel attachment member and the liner attachment member.

The cleats can be in the form of teeth, barbs, stakes, lances, or fins. For certain preferred embodiments the cleats extend from the liner attachment member, but for other embodiments, the cleats may extend from the panel attachment member or from both the liner attachment member and the panel attachment member. For preferred embodiments, the cleats are angled inwardly, thereby facilitating the insertion of the liner in the retainer, while resisting the retraction of the liner through normal use of the cargo bed. Therefore, for preferred embodiments, the angle between the cleat axis and the liner attachment member is less than 90° and for most liner materials and applications will be less than 90° but more than 45°. The cleats may be made of metal or may be made or plastic or other resilient material and may be rigid or flexible.

A tapered retainer embodiment of the retainer which has a tapered support member may be used on vertical cargo panels, loader buckets and other types of cargo bins to facilitate the movement of cargo, particularly loose cargo such as gravel in a dump truck, past the retainer.

A level joint retainer embodiment which has opposing panel attachment members and opposing liner attachment members, provides for two liners to be joined and abutted together to create a continuous liner. For this embodiment, the support member connects the opposing panel attachment members and the opposing liner attachment members. This embodiment is suited for joining liners where there is no slope change.

A convex joint retainer embodiment provides for the joining and abutting of two liners at a joint which is a point of cargo panel slope change, such as that in the sloped floor of a belly dump train car. For this embodiment, the support member provides for a selected liner angle between the joined liners, which is less than 180 degrees. Similarly, a concave joint retainer embodiment provides for a liner angle which is greater than 180 degrees.

Any of the versions of the retainer, can be made with curves to fit curved exterior edges and curved joints between adjoining liner sheets.

The panel attachment member of the retainer may be attached to a cargo panel by bolting, riveting, gluing, adhering, magnetizing, welding or a combination of these methods. Self tapping screws may also be used. Other devices and methods for attaching the panel attachment member to a cargo panel will be known to persons skilled in the art.

Welding of the panel attachment member of each retainer to the cargo bed can provide an additional benefit of sealing the edge of the liner so that no moisture, cargo material or debris gets between the liner and the cargo bed. This is essential for hauling many types of cargo, such as corrosive or hazardous material. Other means of sealing the edges of the liner may be used for such applications.

There is a tendency of the liners, even the high density plastic liners, to expand and contract significantly with temperature changes. This can result in bubbling of the liner in high temperatures. Embodiments of the retainer of the present invention can be used to minimize the adverse effects of this thermal expansion and contraction. For a slide embodiment, the liner is securely attached to the panel attachment member by screws or other fasteners and is secured to the liner attachment member by cleats, but the panel attachment member is not attached to the cargo panel. This allows the panel attachment member to slide freely upon the cargo panel as the liner expands and contracts. Alternatively, for a slip embodiment, the panel attachment member is attached to the cargo panel but the liner attachment member has no cleats. This allows the edge of the liner to slide back and forth in the retainer, as the liner expands and contracts.

DETAILED DESCRIPTION OF PREFERRED EMBODIMENTS

Figure 1:
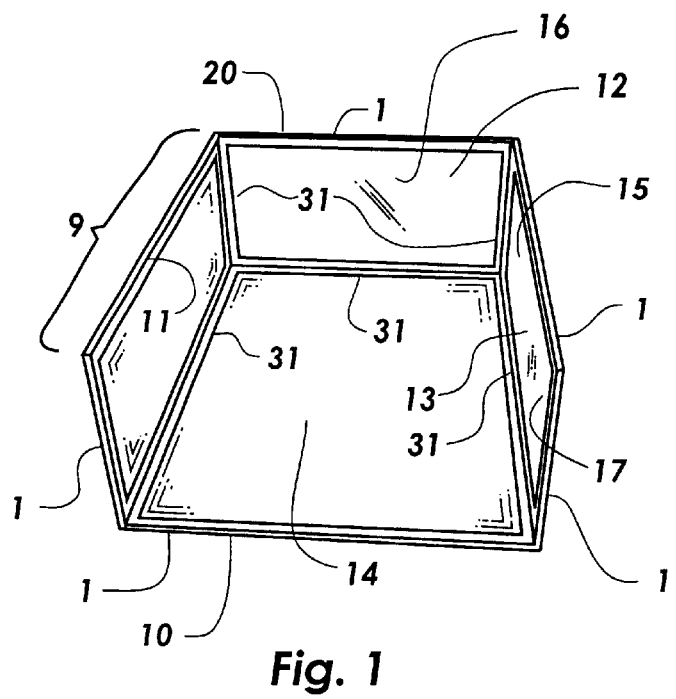
FIG. 1 is a top perspective view of a dump truck bed with two preferred embodiments of the liner retainer of the present invention installed, thereby securing liners to four cargo panels of the dump truck bed.
Figure 2:
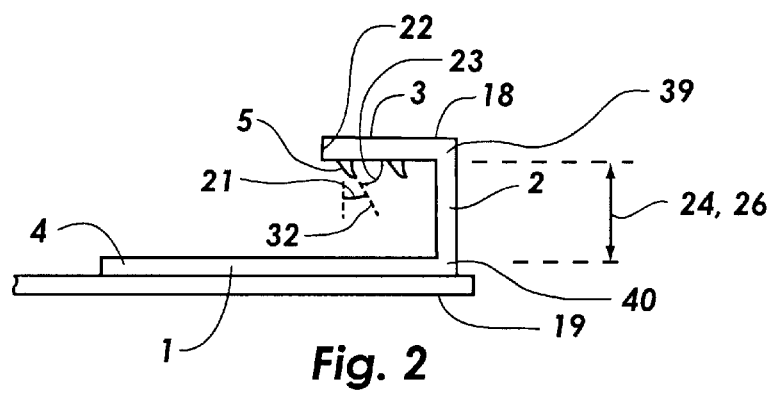
FIG. 2 is a side cross-section view of a preferred embodiment of the liner retainer of the present invention for use on an outside edge of a cargo panel.
Figure 3:
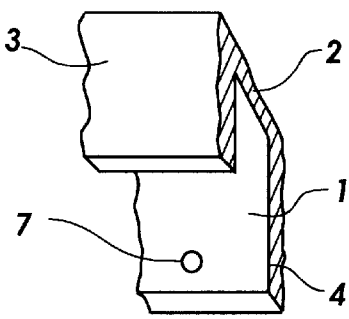
FIG. 3 is a top perspective view of a segment of the embodiment of the liner retainer shown in FIG. 2.
Figure 4:
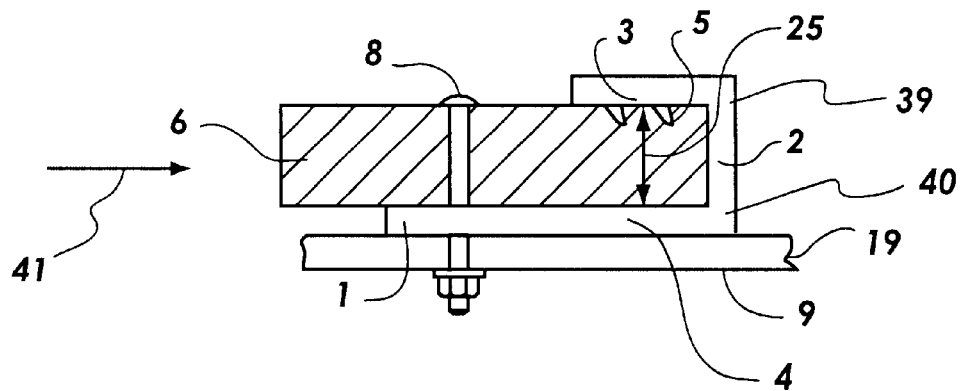
FIG. 4 is a side cross-section view of the embodiment of the liner retainer shown in FIG. 2 with an inserted protective bed liner.
Figure 9:
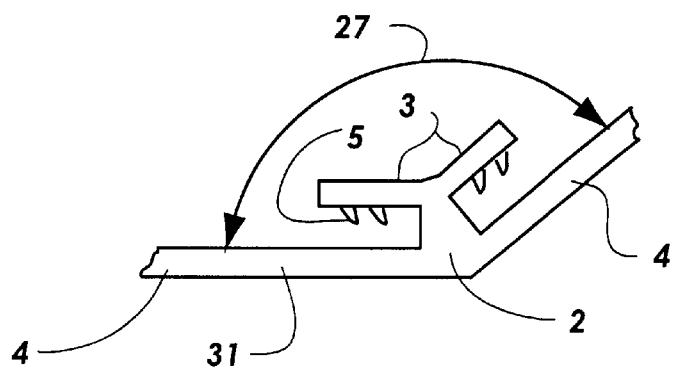
FIG. 9 is a side cross-section view of an embodiment of the liner retainer of the present invention with opposing panel attachment members and liner attachment members for joining abutting liners at a concave joint between cargo panels.

Referring first to FIGS. 2, 3 and 4, a basic embodiment of the protective liner retainer 1 of the present invention for securing a protective liner 6 to a cargo bed 9 is shown. Cargo beds may consist of one or more cargo panels. The cargo bed of a flat bed truck, for instance, might have a single cargo panel, whereas, referring to FIG. 1, a dump truck cargo bed 20 will have at least four cargo panels, i.e. a front panel 12, a left side panel 11, a right side panel 13 and a bottom panel 10. FIG. 1 shows a feasible retainer placement for a dump truck cargo bed or similar vehicles. A front liner 16, a left liner 15, a right liner 17 and a bottom liner 14 may be secured by one or more retainers on each edge. For the cargo bed shown in FIG. 1, the left liner and the right liner are each secured by two basic retainers 1 and two concave joint retainers 31 which are shown in FIG. 9. The front liner and the bottom liner are each secured by one basic retainer and three concave joint retainers. Abutting liners with different slopes can be secured with basic retainers or with the concave or convex joint retainers shown in FIGS. 7 and 9 respectively, depending upon the angle between the abutting liners.

Protective liners placed on these panels protect the panels from wear related to contact with load and weathering. These liners are prone to curl at their ends exposing the panels to load and weathering. The present invention prevents curling of a liner while securing the liner to a cargo panel.

Plastic is a preferred material for the liners, but other materials such as metal, metal alloy, wood, fiberglass and rubber may be used with the present invention. Ultra high molecular weight (UHMW) plastic, polypropylene, and high density polyethylene are preferred plastics for the liner material. Preferred embodiments of the retainer are constructed of a metal or metal alloy, but may be constructed of plastic or other resilient material.

Referring again to FIGS. 2, 3 and 4, in one aspect of the invention, panel attachment means for attaching the present invention to a cargo panel is taught. The panel attachment means includes a panel attachment member 4 which is typically a flat plate with retainer bolt holes 7 spaced as needed. Fasteners 8 inserted through the liner 6 and the panel attachment member, secure the panel attachment member and the liner to the cargo panel 19. Because each liner is typically secured by more than one retainer, the number of bolts required for each retainer will largely be determined by the length of the retainer and its stiffness.

In another aspect of the invention, liner attachment means for attaching the invention to a cargo bed liner is taught. The liner attachment means includes a liner attachment member 3. For preferred embodiments securing liners in the preferred sheet form, the liner attachment member is aligned with the panel attachment member in parallel fashion.

In another aspect of the invention gripping means for gripping a liner is taught. For certain preferred embodiments, the gripping means includes one or more cleats 5. The cleats can be in the form of teeth, barbs, stakes, lances, or fins. For certain preferred embodiments the cleats extend from the liner attachment member 3 as shown in FIGS. 2 and 4, but for other embodiments, the cleats may extend from the panel attachment member or from both the liner attachment member and the panel attachment member. For preferred embodiments, the cleats are angled inwardly by a cleat angle 21 from the liner insertion end 22, thereby facilitating the insertion of the liner 6 in the retainer as shown in FIG. 4, while resisting the retraction of the liner through normal use of the cargo bed. Therefore, for preferred embodiments, the cleat bias angle 23 between the cleat axis 32 and the liner attachment member is less than 90° and for most liner materials and applications will be less than 90° but more than 45°. The cleats may be made of metal or may be made or plastic or other resilient material and may be rigid or flexible.

In another aspect of the invention, support means for connecting the liner attachment member to the panel attachment member is taught. The support means include a support member 2. The support member connects the outside end 39 of the liner attachment member to outside end 40 of the panel attachment member, and the support member length 26 is such to maintain a retainer space 24 between the liner attachment member and the panel attachment member corresponding to the liner thickness 25 as shown in FIG. 4. The support member also limits the longitudinal movement 41 of the liner in the retainer.

Figure 5:
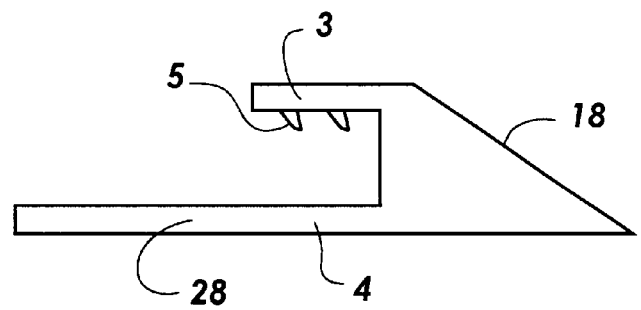
FIG. 5 is a side cross-section view of an embodiment of the liner retainer of the present invention with a sloped support member for facilitating movement of materials over the retainer.

Referring now to FIG. 5, a tapered retainer 28 embodiment of the retainer is shown which has a tapered support member 18. This embodiment may be used on vertical cargo panels, loader buckets and other types of cargo bins to facilitate the movement of cargo, particularly loose cargo such as gravel in a dump truck, past the retainer.

Figure 6:
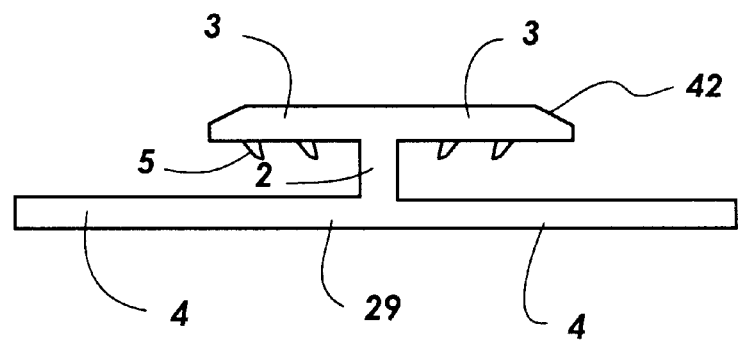
FIG. 6 is a side cross-section view of an embodiment of the liner retainer of the present invention with opposing panel attachment members and liner attachment members for joining abutting protective liners.

Referring to FIG. 6, a level joint retainer 29 embodiment of the retainer which has opposing panel attachment members 4 and opposing liner attachment members 3, which provides for two liners to be joined and abutted together to create a continuous liner. For this embodiment, the support member 2 connects the opposing panel attachment members and the opposing liner attachment members. This embodiment is suited for joining liners where there is no slope change. The liner attachment member may have a tapered liner insertion end 42 for any embodiment of the present invention to facilitate the movement of cargo over the liner attachment member, as illustrated for the embodiment shown in FIG. 6.

Figure 7:
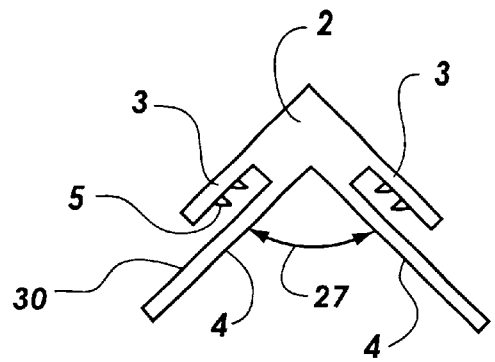
FIG. 7 is a side cross-section view of an embodiment of the liner retainer of the present invention with opposing panel attachment members and liner attachment members for joining abutting liners at a convex joint between cargo panels.
Figure 8:
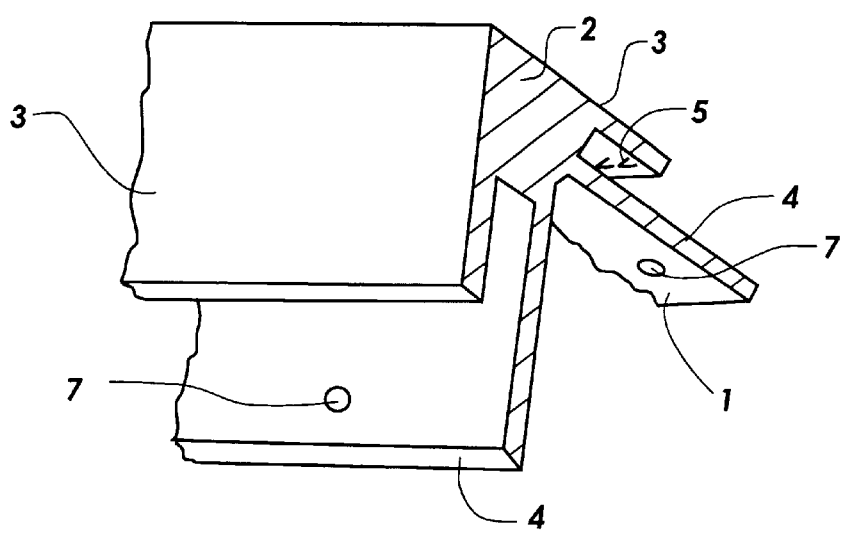
FIG. 8 is a top perspective view of a segment of the embodiment of the liner retainer shown in FIG. 7.

Referring to FIGS. 7 and 8, a convex joint retainer 30 embodiment of the retainer, which is a further variation of the embodiment of FIG. 6 is shown. This embodiment provides for the joining and abutting of two liners at a joint which is a point of cargo panel slope change, such as that in the sloped floor of a belly dump train car. For this embodiment, the support member 2 provides for a selected liner angle 27 between the joined liners, which is less than 180 degrees. Referring to FIG. 9, a concave joint retainer 31 embodiment is shown which provides for a liner angle which is greater than 180 degrees.

While the embodiments of the retainer shown in FIG. 1 are straight, because the joints between the respective cargo panels are straight, any of the versions of the retainer, including those shown in FIGS. 2, 5, 6, 7 and 9, can be made with curves to fit curved exterior edges and curved joints between adjoining liner sheets.

It should be noted that many manufacturers supply cargo panels for trucks, rail cars, truck trailers, dump-trucks, and the like with pre-drilled beds for bolting liners to cargo bed panels. For others, holes can be drilled in the panels. In one aspect of the invention when a panel attachment member and a cargo panel both have holes, they may be secured to one another by aligning one or more holes of the panel attachment member and one or more holes of the cargo panel followed by insertion of a fastener through aligned holes.

For other embodiments of the retainer, the panel attachment member may be welded to a cargo panel rather than being bolted. Those skilled in the art will appreciate methods of welding the apparatus to the cargo bed. The panel attachment member may be attached to the cargo panel using a combination of the methods of bolting, riveting, gluing, adhering, magnetizing, or welding. Self tapping screws may also be used.

Welding of the panel attachment member of each retainer to the cargo bed can provide an additional benefit of sealing the edge of the liner so that no moisture, cargo material or debris gets between the liner and the cargo bed. This is essential for hauling many types of cargo, such as corrosive or hazardous material. Other means of sealing the edges of the liner may be used for such applications.

Figure 13:
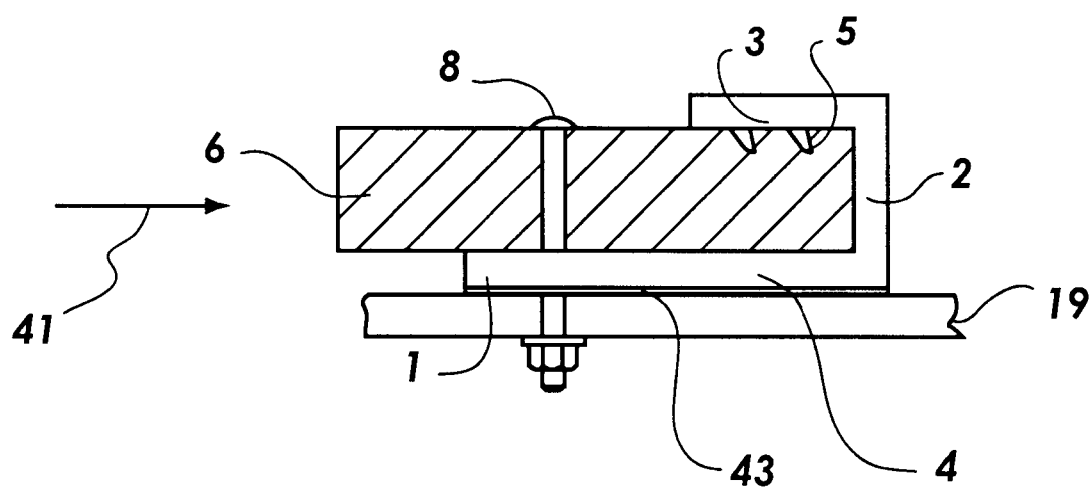
FIG. 13 is a side view cross-section detail showing the use of an optional seal between the panel attachment member of the present invention and the cargo panel.

Such means include a seal 43 between the panel attachment member and the cargo panel as shown in FIG. 13. Such seal can be used with the embodiments of the invention shown in FIGS. 2, 4, 5, 6, 10 and 11.

Figure 10:
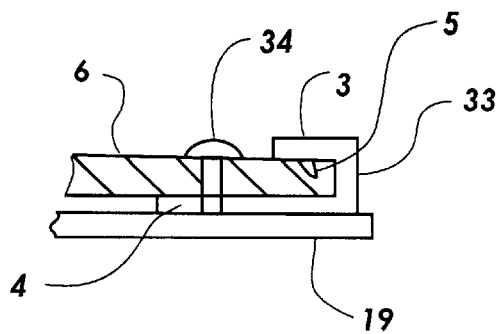
FIG. 10 is a side cross-section view of a slide embodiment of the liner retainer of the present invention providing for expansion and contraction of the liner with temperature variations.
Figure 11:
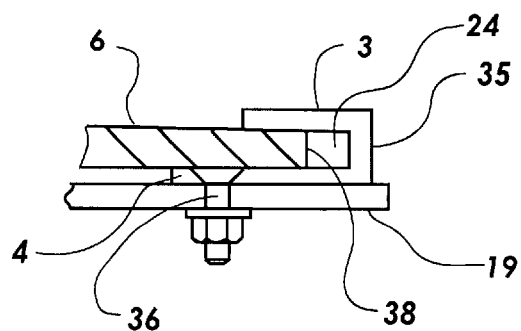
FIG. 11 is a side cross-section view of a slipping embodiment of the liner retainer of the present invention providing for expansion and contraction of the liner with temperature into variations.
Figure 12:
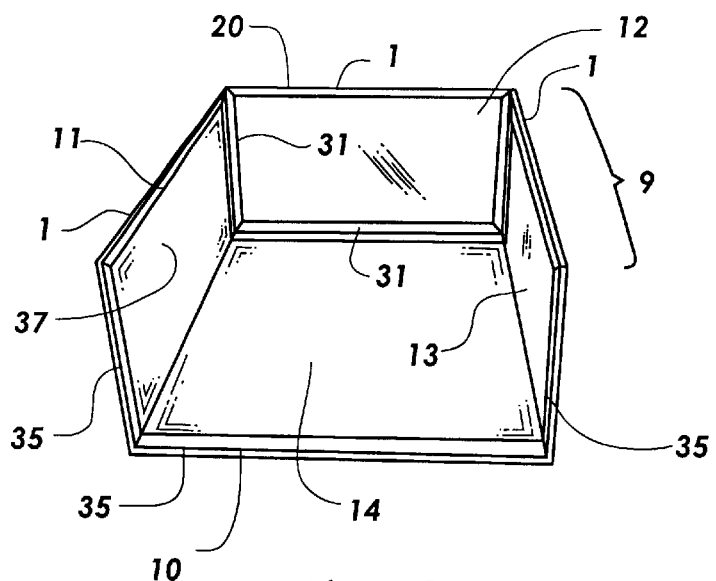
FIG. 12 is a top perspective view of a dump truck bed with the liner retainer of the present invention securing a continuous longitudinal liner extending from the top of the left side panel across the bottom panel to the top of the right side panel.

There is a tendency of the liners, even the high density plastic liners, to expand and contract significantly with temperature changes. This can result in bubbling of the liner in high temperatures. Embodiments of the retainer of the present invention can be used to minimize the adverse effects of this thermal expansion and contraction. Referring to FIG. 12, a continuous longitudinal liner 37 extending from the top of the left side panel to the top of the right side panel can be secured in place by embodiments of the retainer of the present invention. Expansion and contraction of the liner may also be accommodated by use of the embodiment of the retainer shown in FIG. 10 or FIG. 11 on the rear edge of the continuous liner. Referring to FIG. 10, for this slide embodiment 33 of the retainer, the liner 6 is securely attached to the panel attachment member 4 by screws 34 or other fasteners and is secured to the liner attachment member 3 by cleats 5 but the panel attachment member is not attached to the cargo panel 19, thus allowing the panel attachment member to slide freely upon the cargo panel as the liner expands and contracts. Alternatively, referring to FIG. 11, a slip embodiment 35 of the retainer for which the panel attachment member is attached to the cargo panel by fasteners 36 but the liner attachment member has no cleats and the edge of the retainer 38 is allowed to slide back and forth in the retainer space 24, as the liner expands and contracts.

Applications of embodiments of the present invention include but are not limited to snow plow blades, street sweepers, grader blades, sand and salt hoppers for snow removal equipment, industrial shovels, haul pack beds, belly dump beds for train car or truck, end dump truck bed, asphalt transfer rigs, grain bins and silo's, back hoe buckets, front end loader buckets, lime silos, storage tanks, old mining equipment, thickeners, concrete ready mix trucks mix tanks and chutes. Not only does the apparatus of the present invention provide for the protection of the finish and the structural integrity of the protected cargo panel, tank or bin, it also provides for increased ease of loading, handling and dumping of material such as gravel, snow and salt, and for ease in cleaning.

What is claimed is:

1. A liner retainer for securing a protective liner to a cargo panel comprising:
   e) panel attachment member, the panel attachment member having a panel attachment member outside end and a panel attachment member interior surface;
   f) liner attachment member, the liner attachment member having a liner attachment member outside end and a liner attachment member interior surface;
   g) support member connecting the liner attachment member outside end to the panel attachment member outside end, defining a retainer space between the panel attachment member and the liner attachment member for insertion of the protective liner; and
   h) one or more one directional cleats, the cleats each having an axis, the cleats extending from the liner attachment member interior surface or the panel attachment member interior surface, the axis of the cleats being angled toward the support member, thereby providing for gripping of the liner by the cleats as it is inserted in the retainer space.

2. The retainer of claim 1 wherein the panel attachment member has one or more anchor bolt holes for securing the panel attachment member to the cargo panel.

3. The retainer of claim 2 further comprising one or more fasteners inserted through the protective liner and the anchor bolt holes, securing the protective liner and the retainer to the cargo panel.

4. The men retainer of claim 1 wherein the support member is wedge shaped, tapering from its lowest thickness where the support member connects to the liner attachment member outside end, to its greatest thickness where the support member connects to the panel attachment member outside end.

5. The retainer of claim 1 wherein the panel attachment member is constructed for welding to the cargo panel.

6. The retainer of claim 1 wherein the panel attachment member is constructed for continuous welding to the cargo panel thereby sealing the retainer against material intrusion between the protective liner and the cargo panel.

7. The retainer of claim 1 wherein the panel attachment member further comprises a seal for sealing between the panel attachment member and the cargo panel, thereby sealing the retainer against material intrusion between the protective liner and the cargo panel.

8. A liner retainer for securing a protective liner to a cargo panel at a slope change position in the cargo panel comprising:
   a) two opposing panel attachment members;
   b) two opposing liner attachment members;
   c) support member connecting each panel attachment member to its corresponding liner attachment member and connecting the opposing panel attachment members and the opposing liner attachment members to each other, a liner angle between the opposing panel attachment members matching the slope change of the cargo panel, and the support member defining a retainer space between each panel attachment member and the corresponding liner attachment member for insertion of the protective liner; and
   d) one or more one directional cleats, the cleats each having an axis, the cleats extending from the liner attachment member interior surface or the panel attachment member interior surface, of each liner retainer, the axis of the cleats being angled toward the support member.

9. The retainer of claim 8 wherein each panel attachment member has one or more anchor bolt holes for securing the panel attachment member to the cargo panel.

10. The retainer of claim 9 further comprising one or more fasteners inserted through the protective liner and the anchor bolt holes, securing the protective liner and the retainer to the cargo panel.

11. The retainer of claim 8 wherein the panel attachment members are constructed for welding to the cargo panel.

12. The retainer of claim 8 wherein the panel attachment members are constructed for continuous welding to the cargo panel thereby sealing the retainer against material intrusion between the protective liner and the cargo panel.

13. The retainer of claim 8 wherein the panel attachment members further comprise seals for sealing between the panel attachment members and the cargo panel, thereby sealing the retainer against material intrusion between the protective liner and the cargo panel.

14. Slide liner retainer for protecting the end of a protective liner of a cargo panel while providing for sliding of the retainer on the cargo panel as the liner expands and contracts comprising:
   a) panel attachment member, the panel attachment member having a panel attachment member outside end and a panel attachment member interior surface;
   b) liner attachment member, the liner attachment member having a liner attachment member outside end and a liner attachment member interior surface;
   c) support member connecting the liner attachment member outside end to the panel attachment member outside end, defining a retainer space between the panel attachment member and the liner attachment member for insertion of the protective liner; and
   d) one or more one directional cleats, the cleats each having an axis, the cleats extending from the liner attachment member interior surface or the panel attachment member interior surface, the axis of the cleats being angled toward the support member, thereby providing for gripping of the liner by the cleats as it is inserted in the retainer space.

15. The retainer of claim 1 wherein the support member is wedge shaped, tapering from its lowest thickness where the support member connects to the liner attachment member outside end, to its greatest thickness where the support member connects to the panel attachment member outside end.

16. A slip liner retainer for securing a protective liner to a cargo panel while allowing the liner to slip longitudinally in the retainer as the liner expands and contracts comprising:
   a) panel attachment member, the panel attachment member having a panel attachment member outside end and a panel attachment member interior surface;
   b) liner attachment member, the liner attachment member having a liner attachment member outside end and a liner attachment member interior surface; and
   c) support member connecting the liner attachment member outside end to the panel attachment member outside end, defining a retainer space between the panel attachment member and the liner attachment member for insertion of the protective liner.

17. The retainer of claim 16 wherein the panel attachment member has one or more anchor bolt holes for securing the panel attachment member to the cargo panel.

18. The retainer of claim 17 further comprising one or more fasteners inserted through the anchor bolt holes, for securing the retainer to the cargo panel while allowing the liner to slip in the retainer.

19. The retainer of claim 16 wherein the support member is wedge shaped, tapering from its lowest thickness at the connection to the support member to the outside end of the liner attachment member, to its greatest thickness at the connection of the support member to the outside end of the panel attachment member.

20. The retainer of claim 16 wherein the panel attachment member is constructed for welding to the cargo panel.

21. The retainer of claim 16 wherein the panel attachment member is constructed for continuous welding to the cargo panel thereby sealing the retainer against material intrusion between the protective liner and the cargo panel.

22. The retainer of claim 16 wherein the panel attachment member further comprises a seal for sealing between the panel attachment member and the cargo panel, thereby sealing the retainer against material intrusion between the protective liner and the cargo panel.

23. A liner retainer for securing a protective liner to a cargo panel comprising:
   a) panel attachment means for mounting the retainer to the cargo panel;
   b) liner attachment means for attaching the protective liner to the retainer;
   c) support means for connecting the panel attachment means to the liner attachment means, defining a retainer space between the panel attachment means and the liner attachment means for insertion of the protective liner, and limiting the longitudinal displacement of the protective liner in the retainer; and
   d) liner gripping means for securing the liner to the retainer.

24. The retainer of claim 23 wherein the support means includes means for reducing the resistance to the movement of cargo over the retainer.

25. The retainer of claim 23 wherein the panel attachment means is constructed for welding of the panel attachment means to the cargo panel.

26. The retainer of claim 23 wherein the panel attachment means is constructed for continuous welding to the cargo panel thereby sealing the retainer against material intrusion.

27. The retainer of claim 23 wherein the panel attachment means further comprises a seal for sealing between the panel attachment means and the cargo panel, thereby sealing the retainer against material intrusion between the protective liner and the cargo panel.

28. A liner retainer for securing a protective liner to a cargo panel at a slope change position in the cargo panel comprising:
   a) two opposing panel attachment means for mounting the retainer to the cargo panel;
   b) two opposing liner attachment means for attaching the protective liner to the retainer;
   c) support means for connecting each panel attachment means with a corresponding liner attachment means to form a liner retainer and connecting the two liner retainers together, a liner angle between the respective liner retainers matching the slope change of the cargo panel, the support means defining a retainer space between each panel attachment means and the corresponding liner attachment means for insertion of the protective liner, and limiting the longitudinal displacement of the protective liner in the respective liner retainers; and
   d) liner gripping means for securing the liner to the retainer.

29. The retainer of claim 28 wherein the support means includes means for reducing the resistance to the movement of cargo over the retainer.

30. The retainer of claim 28 wherein the panel attachment means are constructed for welding of the panel attachment means to the respective cargo panels.

31. The retainer of claim 28 wherein the panel attachment means are constructed for continuous welding to the respective cargo panels thereby sealing the retainer against material intrusion.

32. The retainer of claim 28 wherein the panel attachment means further comprises seals for sealing between the panel attachment means and the respective cargo panels, thereby sealing the retainer against material intrusion between the protective liner and the cargo panels.

* * * * *